US006564228B1

(12) United States Patent
O'Connor

(10) Patent No.: US 6,564,228 B1
(45) Date of Patent: May 13, 2003

(54) METHOD OF ENABLING HETEROGENEOUS PLATFORMS TO UTILIZE A UNIVERSAL FILE SYSTEM IN A STORAGE AREA NETWORK

(75) Inventor: Michael A. O'Connor, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/483,638

(22) Filed: Jan. 14, 2000

(51) Int. Cl.$^7$ .............................................. G06F 17/30
(52) U.S. Cl. ......................... 707/200; 707/10; 709/226
(58) Field of Search .............................. 707/100, 102, 707/200, 201, 202, 204, 205; 709/223, 226

(56) References Cited

U.S. PATENT DOCUMENTS

| | | | |
|---|---|---|---|
| 5,565,331 A | * 10/1996 | Tessier-Lavigne et al. | 435/320.1 |
| 5,761,680 A | * 6/1998 | Cohen et al. | 707/206 |
| 5,764,972 A | * 6/1998 | Crouse et al. | 707/1 |
| 5,832,513 A | * 11/1998 | Kennedy | 707/1 |
| 6,098,128 A | * 8/2000 | Velez-McCaskey et al. | 709/203 |
| 6,173,293 B1 | * 1/2001 | Thekkath et al. | 707/201 |
| 6,185,574 B1 | * 2/2001 | Howard et al. | 707/102 |
| 6,192,471 B1 | * 2/2001 | Pearce et al. | 710/200 |
| 6,260,120 B1 | * 7/2001 | Blumenau et al. | 707/101 |
| 6,343,324 B1 | * 1/2002 | Hubis et al. | 709/229 |

FOREIGN PATENT DOCUMENTS

| | | | |
|---|---|---|---|
| WO | WO 9824025 A1 | * 6/1998 | G06F/11/00 |

OTHER PUBLICATIONS

Seltzer et al., "File System Logging versus Clustering: A Performance Comparison," Proceedings of the 1995 Winter USENIX Technical Conference, Jan. 1995, 16 pages.
Seltzer et al., "An Implementation of a Log–Structured File System for UNIX," Proceedings of the 1993 Winter USENIX Technical Conference, Jan. 1993, pp. 1–18.
Rosenblum et al., "The Design and Implementation of a Log–Structured File System," Jul. 1991, pp. 1–15.
Ousterhout et al., "Beating the I/O Bottleneck: A Case for Log–Structured File Systems," Jan. 1992, pp. 1–18.

* cited by examiner

*Primary Examiner*—Hosain T. Alam
(74) *Attorney, Agent, or Firm*—Meyertons Hood Kivlin Kowert & Goetzel, P.C.; B. Noël Kivlin

(57) ABSTRACT

A network file system and method wherein a storage area network Universal File System allows any host in a heterogeneous based storage area network to read or write data as if in its native format. Any host coupled to the storage area network may be configured to access any storage device on the storage area network. By augmenting the operating system of a host, the host is enabled to mount the Universal File System. Subsequent to mounting the Universal File System, a host may read data from and write data to the Universal File System.

21 Claims, 16 Drawing Sheets

Total Space = 16 * 64 = 1024 bytes
File A Size = 129 bytes
File B Size = 68 bytes
File C Size = 156 bytes
Space Required = 353 bytes
Space Used = 512 bytes
Space Free = 512 bytes (50 %)
Space Wasted = 159 bytes (15.5%)

Total Space = 16 * 64 = 1024 bytes
File A Size = 129 bytes
File B Size = 68 bytes
File C Size = 156 bytes
Space Required = 353 bytes
Space Used = 353 bytes
Space Free = 671 bytes (65.5%)
Space Wasted = 0%

METHOD OF ENABLING HETEROGENEOUS PLATFORMS TO UTILIZE A UNIVERSAL FILE SYSTEM IN A STORAGE AREA NETWORK

BACKGROUND OF THE INVENTION

1. Field of the Invention

This invention is related to the field of computer networks and, more particularly, to storage area network file systems.

2. Description of the Related Art

While individual computers enable users to accomplish computational tasks which would otherwise be impossible by the user alone, the capabilities of an individual computer can be multiplied by using it in conjunction with one or more other computers. Individual computers are therefore commonly coupled together to form a computer network.

Computer networks may be interconnected according to various topologies. For example, several computers may each be connected to a single bus, they may be connected to adjacent computers to form a ring, or they may be connected to a central hub to form a star configuration. These networks may themselves serve as nodes in a larger network. While the individual computers in the network are no more powerful than they were when they stood alone, they can share the capabilities of the computers with which they are connected. The individual computers therefore have access to more information and more resources than standalone systems. Computer networks can therefore be a very powerful tool for business, research or other applications.

In recent years, computer applications have become increasingly data intensive. Consequently, the demand placed on networks due to the increasing amounts of data being transferred has increased dramatically. In order to better manage the needs of these data-centric networks, a variety of forms of computer networks have been developed. One form of computer network is a "Storage Area Network". Storage Area Networks (SAN) connect more than one storage device to one or more servers, using a high speed interconnect, such as Fibre Channel, Unlike a Local Area Network (LAN), the bulk of storage is moved off of the server and onto independent storage devices which are connected to the high speed network. Servers access these storage devices through this high speed network.

One of the advantages of a SAN is the elimination of the bottleneck that may occur at a server which manages storage access for a number of clients. By allowing shared access to storage, a SAN may provide for lower data access latencies and improved performance. However, because there exists a variety of file formats and no universal standard, the most common SAN configuration involves a homogeneous collection of hosts all utilizing the same file format. While homogeneous configurations may take advantage of some of the benefits of SANs, many organizations include non-homogeneous systems consisting of a variety of computing platforms which they would like to use together.

When building a SAN for a heterogeneous environment, the problems of dealing with incompatible file formats can be a significant barrier to data sharing. One possible solution is to restrict access for particular type of host to a storage device of the same type. However, such a restriction results in the loss of many of the benefits of shared access to storage devices on the SAN. Another possible solution is to utilize a complicated scheme of importing, exporting and translating data. However, such mechanisms typically involve undue overhead and frequently result in the loss of information in the process.

Another feature of file systems which may impact performance involves how recovery from system interruptions are handled. Typically, when a file system crashes or is otherwise interrupted, the host node must go through a lengthy process upon restarting which may cause the node and file system to be unavailable for a significant period of time.

SUMMARY OF THE INVENTION

The problems outlined above are in large part solved by a network file system and method as described herein. A storage area network universal file system allows any host in a heterogeneous based SAN to read or write data as if in its native format. Advantageously, any host may be configured to access any storage device on the SAN and performance may be improved.

Broadly speaking, a method of enabling a first host of a heterogeneous storage area network to access a universal file system of a storage device is contemplated. In the heterogeneous storage area network, the native file system of the first host is incompatible with the universal file system of the storage device. By augmenting the operating system of the first host, the first host is enabled to mount the universal file system. Further, the storage area network includes a second host which is mounted on the universal file system. This second host has a native file system which is incompatible with the native file system of the first host. Subsequent to mounting the universal file system, each of the first and second hosts may read data from and write data to the universal file system.

BRIEF DESCRIPTION OF THE DRAWINGS

Other objects and advantages of the invention will become apparent upon reading the following detailed description and upon reference to the accompanying drawings in which.

Figure 1:
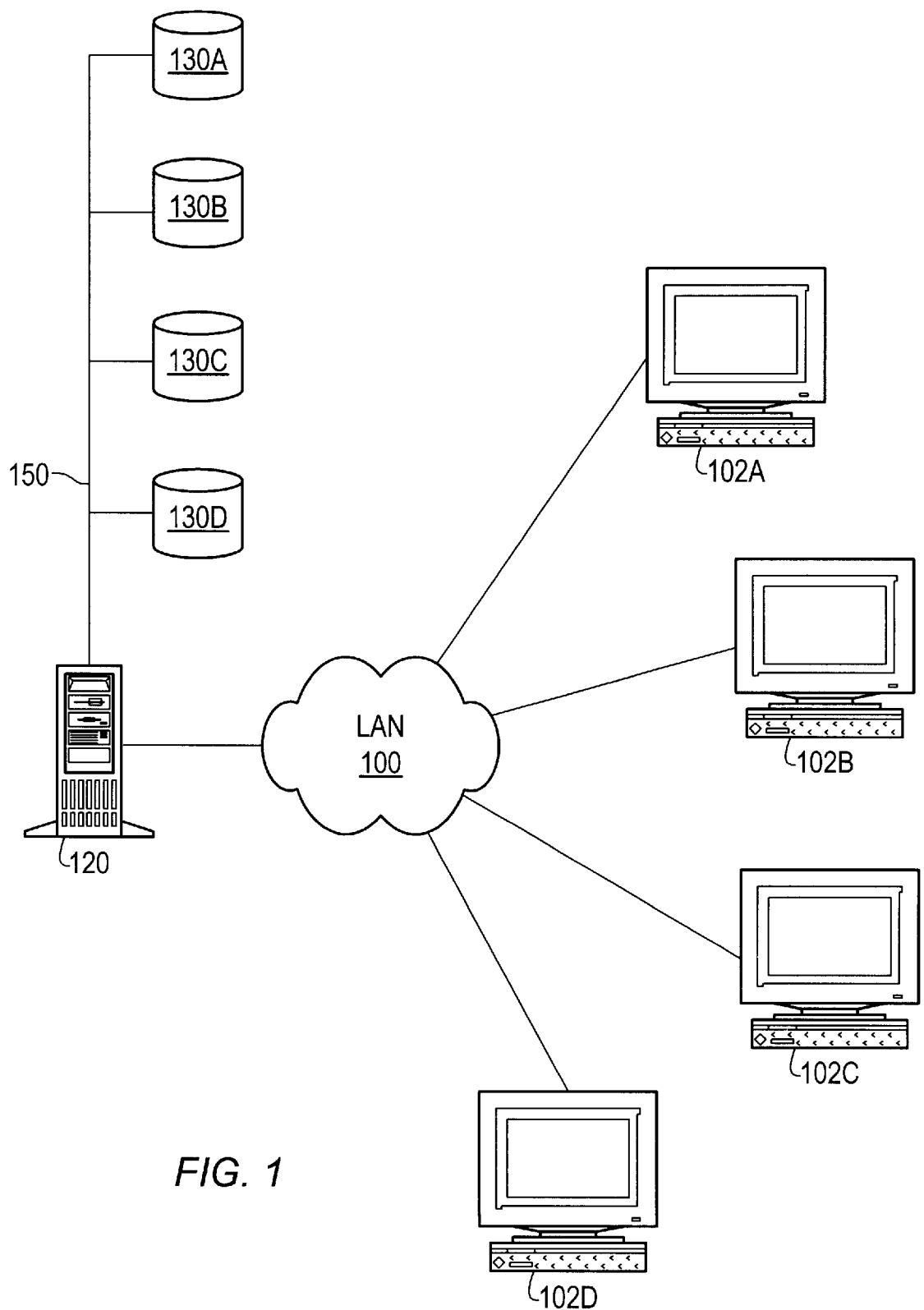
FIG. 1 is an illustration of a local area network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Overview of Storage Area Networks

Computer networks have been widely used for many years now and assume a variety of forms. One such form of network, the Local Area Network (LAN), is shown in FIG. 1. Included in FIG. 1 are workstations 102A–102D, LAN interconnection 100, server 120, and data storage 130. LAN interconnection 100 may be any number of well known network topologies, such as Ethernet, ring, or star. Workstations 102 and server 120 are coupled to LAN interconnect. Data storage 130 is coupled to server 120 via data bus 150.

The network shown in FIG. 1 is known as a client-server model of network. Clients are devices connected to the network which share services or other resources. These services or resources are administered by a server. A server is a computer or software program which provides services to clients. Services which may be administered by a server include access to data storage, applications, or printer sharing. In FIG. 1, workstations 102 are clients of server 120 and share access to data storage 130 which is administered by server 120. When one of workstations 102 requires access to data storage 130, the workstation 102 submits a request to server 120 via LAN interconnect 100. Server 120 services requests for access from workstations 102 to data storage 130. Because server 120 services all requests for access to storage 130, requests must be handled one at a time. One possible interconnect technology between server and storage is the traditional SCSI interface. A typical SCSI implementation may include a 40 MB/sec bandwidth, up to 15 drives per bus, connection distances of 25 meters and a storage capacity of 136 gigabytes.

As networks such as shown in FIG. 1 grow, new clients may be added, more storage may be added and servicing demands may increase. As mentioned above, all requests for access to storage 130 will be serviced by server 120. Consequently, the workload on server 120 may increase dramatically and performance may decline. To help reduce the bandwidth limitations of the traditional client server model, Storage Area Networks (SAN) have become increasingly popular in recent years. Storage Area Networks interconnect servers and storage at high speeds. By combining existing networking models, such as LANs, with Storage Area Networks, performance of the overall computer network may be improved.

Figure 2:
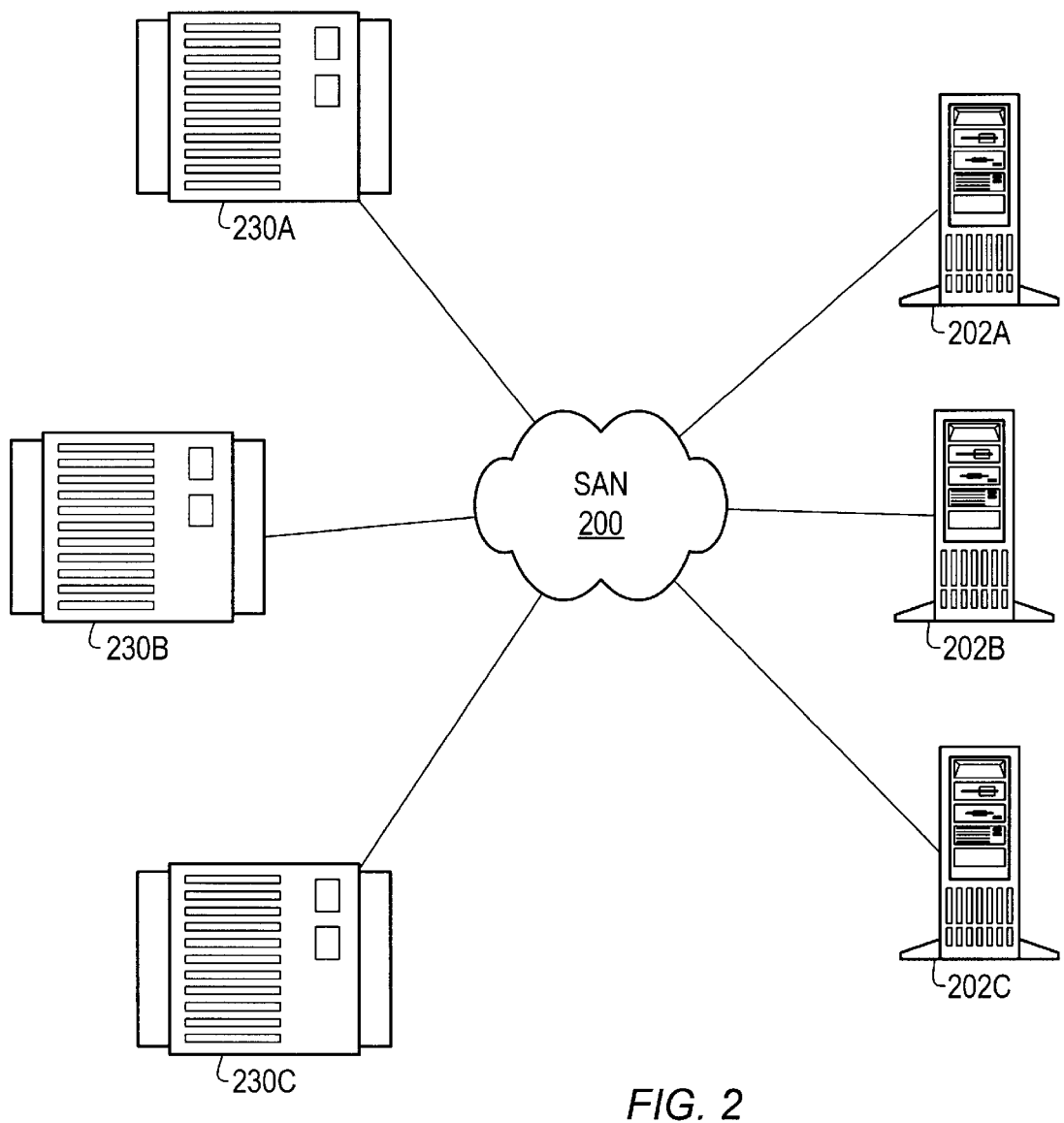
FIG. 2 is an illustration of a storage area network.

FIG. 2 shows one embodiment of a SAN. Included in FIG. 2 are servers 202, data storage devices 230, and SAN interconnect 200. Each server 202 and each storage device 230 is coupled to SAN interconnect 200. Servers 202 have direct access to any of the storage devices 230 connected to the SAN interconnect. SAN interconnect 200 is a high speed interconnect, such as Fibre Channel. As FIG. 2 shows, the servers and storage devices comprise a network in and of themselves. In the SAN of FIG. 2, no server is dedicated to a particular storage device as in a LAN. Any server 202 may access any storage device 230 on the storage area network in FIG. 2. Typical characteristics of a SAN may include a 200 MB/sec bandwidth, up to 126 nodes per loop, a connection distance of 10 kilometers, and a storage capacity of 9172 gigabytes. Consequently, the performance, flexibility, and scalability of a SAN may be significantly greater than that of a typical SCSI based system.

Figure 3:
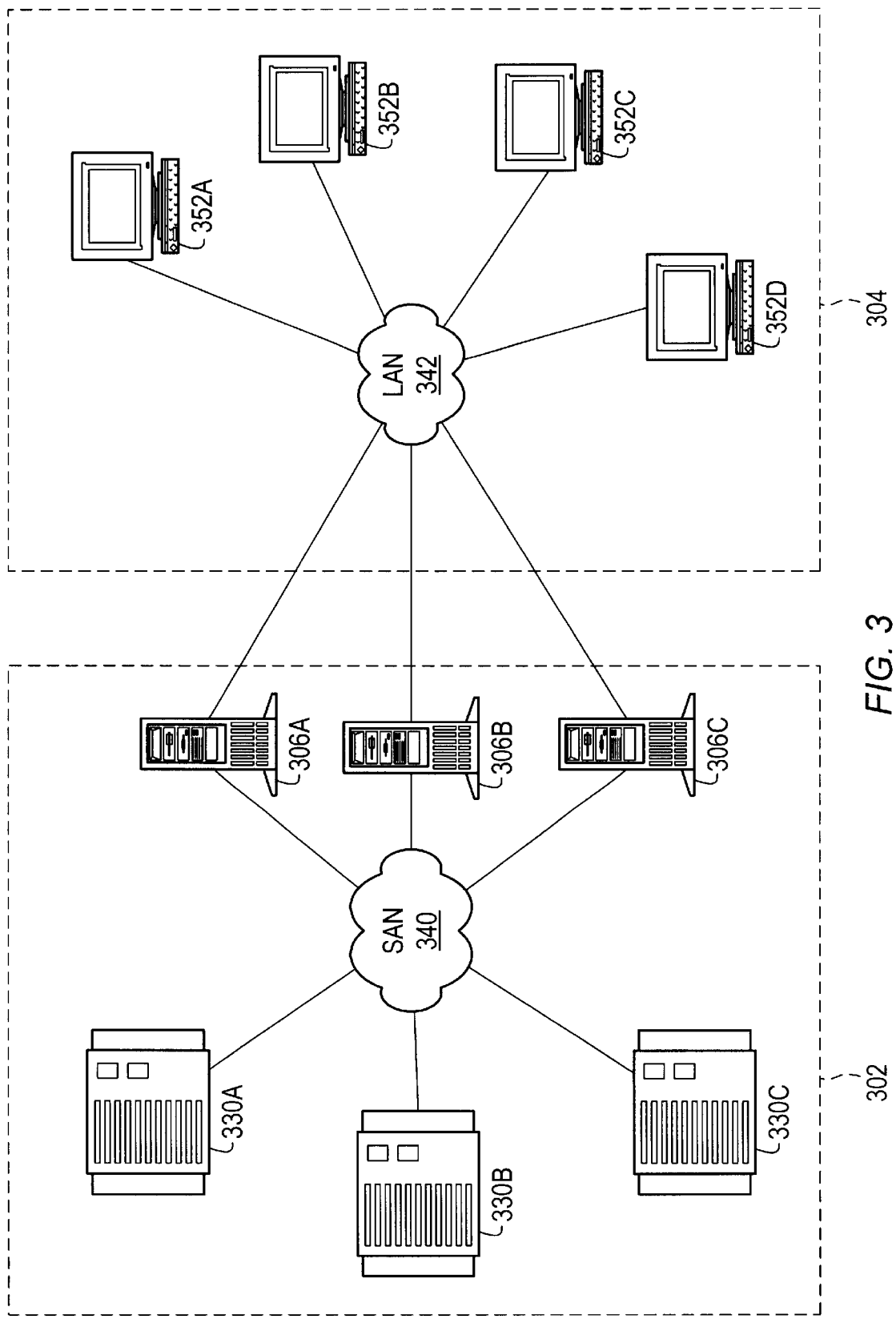
FIG. 3 is an illustration of a computer network including a storage area network in which the invention may be embodied.

FIG. 3 shows one embodiment of a SAN and LAN in a computer network. Included are SAN 302 and LAN 304. SAN 302 includes servers 306, data storage devices 330, and SAN interconnect 340. LAN 304 includes workstation 352 and LAN interconnect 342. As shown in FIG. 3, LAN 342 is coupled to SAN servers 306. Because each storage device 330 may be independently and directly accessed by any server 306, overall data throughput between LAN 304 and SAN 302 may be much greater than that of the traditional client-server LAN. For example, if workstations 352A and 352C both submit access requests to storage 330, two of servers 306 may service these requests concurrently. By incorporating a SAN into the computer network, multiple servers 306 may share multiple storage devices and simultaneously service multiple client 352 requests and performance may be improved.

Heterogeneous v. Homogeneous Networks

When an existing business or other entity chooses to invest in a SAN, it typically already has an existing computing network or collection of devices which it uses. In many cases these devices may all operate on a common platform. Common computing platforms include UNIX and Windows NT. However, in other cases, an entity may have devices operating on a variety of platforms. The use of differing computing platforms in a common computer network introduces many challenges that may not exist when using a common platform.

Generally, one operating platform utilizes a file system which is incompatible with the file system of a different platform. Consequently, a server of one platform may not be able to read or write data to a storage device which is configured for use by a different platform. In the context of a SAN, where direct access to storage devices and sharing of storage devices is highly desirable, the inability of one or more servers to access one or more storage devices may reduce potential system performance dramatically. To solve this problem, a universal file system may be used in which any server may have access to any storage device on the SAN. Advantageously, overall system performance may be improved and devices of differing platforms may be used to share data.

File Systems

Different operating systems utilize different file systems. For example the Unix operating system uses a different file system than the Microsoft Windows NT operating system. In general, a file system is a collection of files and tables with information about those files. Data files stored on disks assume a particular format depending on the system being used. However, disks typically are composed of a number of platters with tracks of data which are further subdivided into sectors. Generally, a particular track on all such platters is called a cylinder. Further, each platter includes a head for reading data from and writing data to the platter.

In order to locate a particular block of data on a disk, the disk I/O controller must have the drive ID, cylinder number, read/write head number and sector number. Each disk typically contains a directory or table of contents which includes information about the files stored on that disk. This directory includes information such as the list of filenames and their starting location on the disk As an example, in the Unix file system, every file has an associated unique "inode" which indexes into an inode table. A directory entry for a filename will include this inode index into the inode table where information about the file may be stored. The inode encapsulates all the information about one file or device (except for its name, typically). Information which is stored may include file size, dates of modification, ownership, protection bits and location of disk blocks.

In other types of file systems which do not use inodes, file information may be stored directly in the directory entry. For example, if a directory contained three files, the directory itself would contain all of the above information for each of the three files. On the other hand, in an inode system, the directory only contains the names and inode numbers of the three files. To discover the size of the first file in an inode based system, you would have to look in the file's inode which could be found from the inode number stored in the directory.

Figure 4:
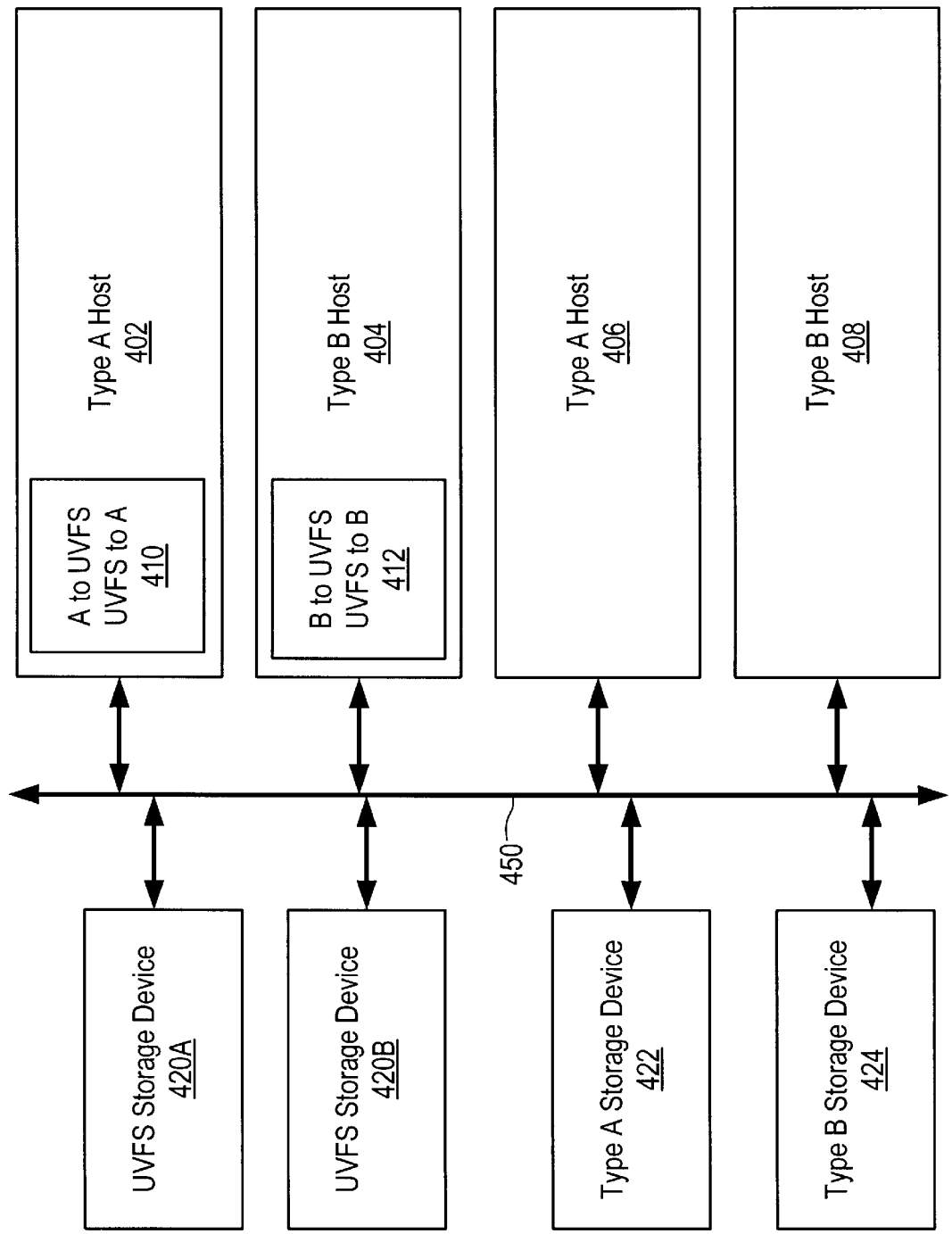
FIG. 4 is a block diagram of a storage area network.

By using a universal file system and enabling hosts to utilize this universal file system, many of the problems associated with heterogeneous networks may be alleviated. FIG. 4 is a block diagram illustrating one embodiment of a heterogeneous SAN in which a universal file system mechanism is utilized. FIG. 4 includes Universal File System (UVFS) storage devices 420, type A storage device 422, type B storage device 424, type A hosts 402 and 406, and type B hosts 404 and 408. In addition, type A host 402 and type B host 404 both include universal file system mechanisms 410 and 412, respectively. In FIG. 4, all hosts 402, 404, 406 and 408 and storage devices 420, 422 and 424 are coupled to SAN interconnect 450. In addition, the file system of the UVFS storage devices 420 is not compatible with the file systems of type A hosts 402 and 406, or type B hosts 404 and 406. Also, the file system of type A hosts 402 and 406 is not compatible with the file systems of type B hosts 404 and 408.

In the embodiment shown in FIG. 4, because the file system of type A host 406 is incompatible with the UVFS file system and the type B file system, type A host 406 may only access type A storage device 422. Likewise, type B host 408 may only access type B storage device 424. However, because type A host 403 has been configured with a UVFS mechanism 410, type A host 410 may access UVFS storage devices 420A and 420B, as well as type A storage device 422. Further, because type B host 404 has been configured with a UVFS mechanism 412, type B host 404 may access UVFS storage devices 420A and 420B, as well as type B storage device 424. Advantageously, even though type A host 402 and type B host 404 have file systems which are incompatible with the UVFS file system, by being configured to utilize the UVFS file system they may access UVFS storage devices 420. Further, UVFS mechanism 410 is configured such that type A host 402 sees data stored on the UVFS storage devices 420 as if it were stored in a format compatible with its own type A format. Similarly, UVFS mechanisms 412 is configured such that type B host 404 sees data stored on the UVFS storage devices 420 as if it were stored in a format compatible with its own type B format.

In addition to providing access to additional storage devices and viewing data stored on the UVFS storage devices 420 as if it were stored in a compatible format, type A host 402 may transparently share data with type B host 404 as if they used the same file system and data format. Advantageously, hosts and storage devices of differing platforms may be brought together in a single network. Like type A host 402 and type B host 404, other hosts may be configured to utilize UVFS storage devices 420 as needed. Those hosts which do not require access to UVFS devices 420 need not be configured to do so. UVFS mechanisms 410 and 412 may be either hardware or software. In a software embodiment, the mechanism may be made native to the file system of the host by making it part of the operating system itself. In one embodiment, the operating system kernel may be modified. By making it part of the operating system, the overhead associated with running add-on software is eliminated and performance may be improved.

Figure 5:
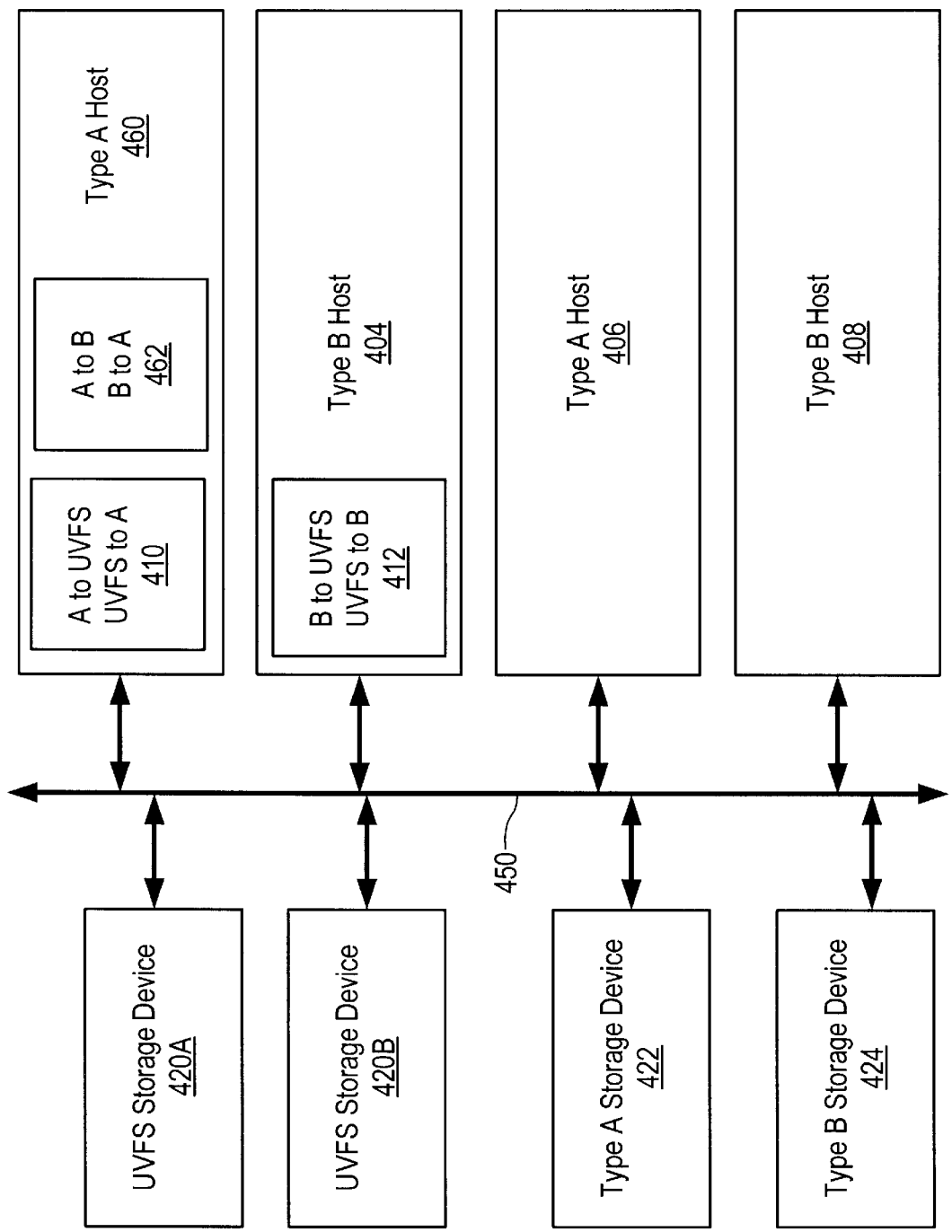
FIG. 5 is a block diagram of a storage area network.

Further, any host may be configured to utilize the file system of any other host. For example, if it is determined that type A host 402 has a need to access type B storage device 424, type A host 402 may be additionally configured to utilize the type B device 424 file system. FIG. 5 illustrates a type A host 460 which is configured to utilize both a UVFS and type B file system. In addition to UVFS mechanism 410, type A host 460 includes type B mechanism 462 which allows it to utilize type B file systems.

In FIG. 5, type A host 460 has access to type A storage device 422 which has a compatible file system, UVFS storage devices 420, and type B storage device 424. Advantageously, type A host 402 has access to all storage devices 420, 422, and 424 on the network. In addition, type A host 402 may now share data with any other host on the network in FIG. 5. By using the above mechanism, existing heterogeneous systems may be combined to take advantage of their cumulative resources.

As discussed above, in one embodiment, to enable a host to utilize a universal file system, software may be installed as part of the operating system of a host which allows it to mount the universal file system. Once mounted, data may be read from and written to the file system. Nodes which are not enabled, may not mount the file system, cannot see the universal file system and may not access the data stored therein. "Mounting" is the term used to describe making a remote file system available for access locally. For example, when a client mounts a directory on a server, that directory and subdirectories become part of the client's directory hierarchy. Each platform may have its own enabling software package. With a universal file system, each platform need only create a package for accessing the universal file system and can be assured of being able to share data with other platforms which are enabled in like manner.

Universal Access Control

File systems generally include file access and security mechanisms. For example, in the Unix operating system, each file and directory has an associated security, or permissions, mask which controls access. In the Windows NT operating system, Access Control Lists (ACL) are used to control access to files. By using a common permissions scheme in a Universal File System, the integrity of data within the system may be ensured.

In the Unix operating system, user Ids (UDs) are used to identify three types of users: User, Group, and Other. Each file stored in a Unix based system includes a permissions mask which indicates the access permissions for each of these three types of users. Each user may have one or more of the following permissions: read access, write access, or execute access. When a user attempts to access a file, the operating system first identifies which type of user is making the request, then checks the permissions for that user to determine if access is granted. The permissions mask for a particular file or directory may be displayed as a string of ten characters. The first character may be used to identify whether a directory or a file is being accessed. The remaining nine characters may be used to indicate the permissions for each of the three groups. An example of a permissions mask may be the string "drwxr-xr-x". In this example, the first character "d" indicates the mask is for a directory (a hyphen may be used to indicate it is not a directory). A permission of "r" or read indicates the file may be read or copied. A permission of "w" or write indicates the file may be modified. Finally, a permission of "x" or execute may indicate the file can be executed. Characters two through four in the string above indicate that the user, or owner, has read, write and execute permission. The remaining two sets of three characters indicate that the group and other users have read and execute permission, but not write permission. In contrast, Windows NT uses a permissions scheme which consists of a security ID of the owner (SID), the owner's group, and an Access Control List (ACL) for the file. Each ACL contains an SID and permissions bits similar to Unix.

In one embodiment, a universal permissions scheme modeled after the Unix scheme may be used in a universal file system to ensure data security and integrity. For example, when configuring a host for a SAN universal file system, a listing of the permissions mask for a file may be "Urwxr-x-x". In this case, the first character indicates this is a universal file system and should be treated as such. The three types of users, User, Group, and Other may remain the same as in the Unix scheme.

File Allocation, Defragmentation, and ZBR Storage

Other differences between file systems include how files are allocated on the disk. Some well known examples of differing techniques include contiguous, linked, indexed, and the inode scheme discussed above. In the contiguous allocation scheme, all the data for a particular file is allocated to a single contiguous space on the disk. The directory entry for a contiguous file allocation may contain the starting address of the data, the number of blocks used, and the last block reserved for the file. In the linked allocation scheme, data for a file is allocated to linked blocks on the disk. Each block contains file data and a link to the next block of file data. A directory entry for a linked allocation scheme may include the starting address of the data, the ending address of the data, and the number of blocks used. In the indexed allocation scheme, each file stored on the disk may have an index configured as an array. Each entry of the array may then contain a pointer to a location on the disk where a particular block of data may be found.

Figure 6:
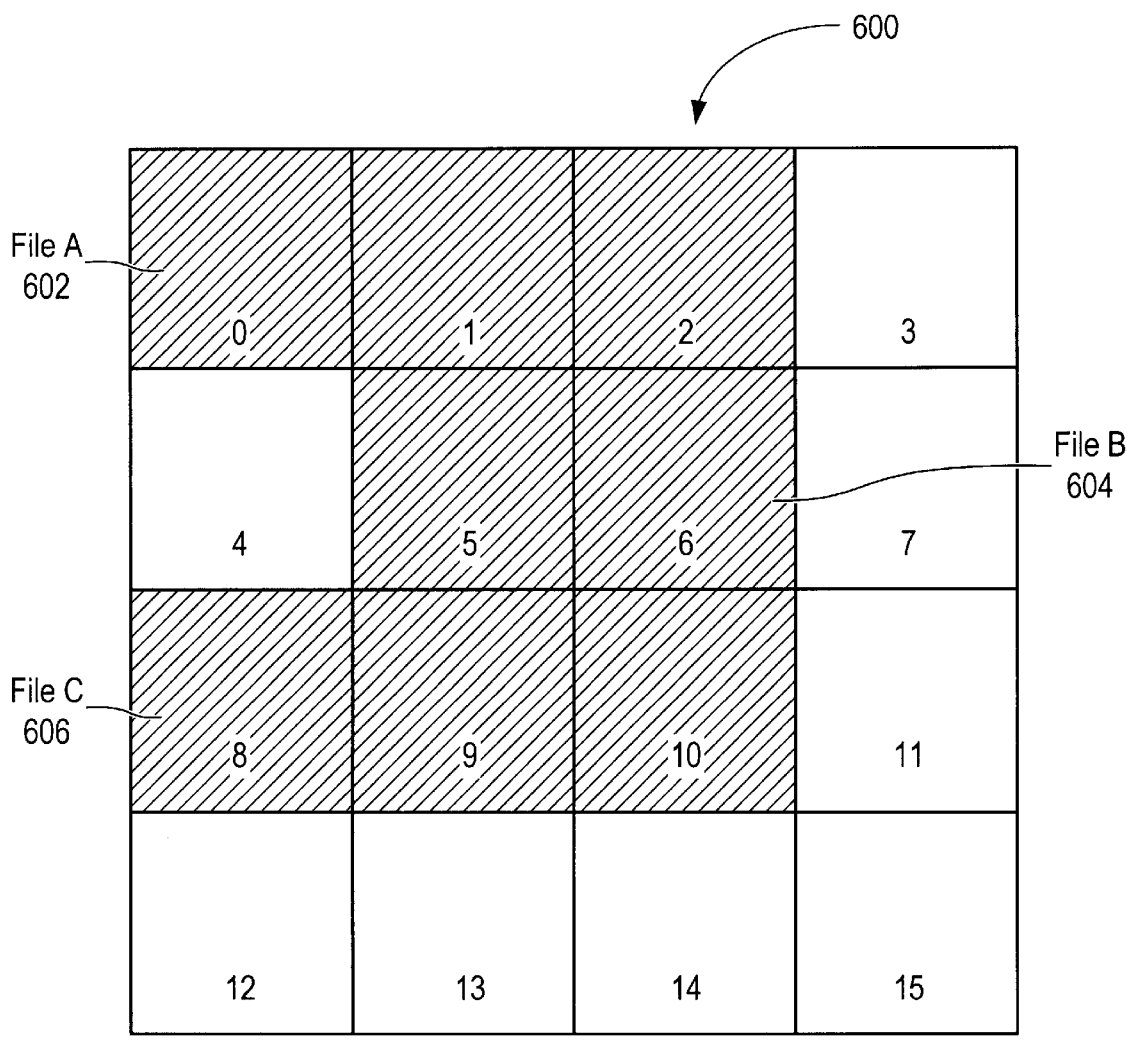
FIG. 6 is an illustration of file allocation in a storage disk.
Figure 7:
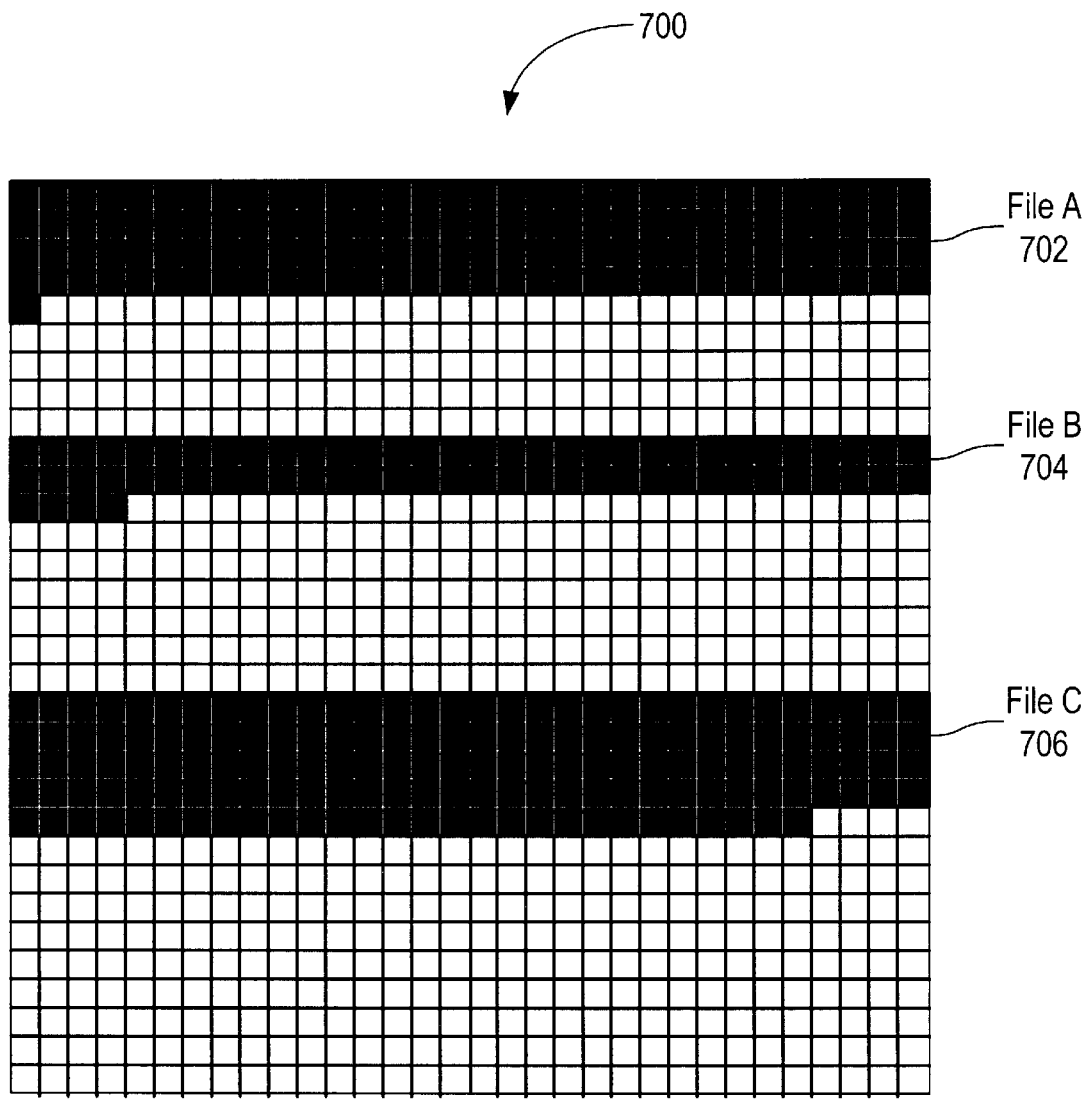
FIG. 7 is an illustration of file allocation in a storage disk.

Typically, storage space on a disk is allocated in fixed size increments or "blocks". The size of this block may be referred to as the "allocation unit" for the disk. Consequently, space allocated for a file will be some multiple of this allocation unit and space may be wasted. For example, FIG. 6 is a diagram representing storage space that may be on a storage disk. FIGS. 6 and 7 are used to illustrate how space may be utilized based on different allocation methods. FIG. 6 includes a storage disk 600, file A 602 which is 129 bytes, file B 604 which is 68 bytes, and file C 606 which is 156 bytes. The total space of disk 600 is 1024 bytes and the allocation unit is 64 bytes. Therefore, disk 600 may accommodate 16 allocation units, 0–15.

File A 602 contains 129 bytes. An allocation of two blocks to file A 602 would accommodate 128 bytes, leaving one byte to be stored. Because the smallest allocation unit is 64 bytes, an additional 64 bytes must be allocated to accommodate this single additional byte. File A 602 may be represented by the shaded region covering blocks 0–2. Consequently, three blocks totaling 192 bytes must be allocated for file A 602. In a similar manner, file B 604 requires an allocation of two blocks and file C 606 requires an allocation of three blocks. In all, eight blocks totaling 512 bytes are allocated for the storage of file A 602, file B 604, and file C 606. Because only 353 bytes are required for the storage of these files, 159 unused bytes have been allocated. Therefore, the storage of files 602, 604, and 606 has resulted in a waste of 15.5% of storage space.

In order to better utilize storage space, a file system with a dynamic allocation unit may be used. FIG. 7 illustrates a file allocation scheme in which only the space required for a file is allocated. FIG. 7 includes storage disk 700, file A 702, file B 704, and file C 706. As above, storage disk 700 has a total space of 1024 bytes, file A 702 is 129 bytes, file B 704 is 68 bytes, and file C 706 is 156 bytes. Using the new scheme, 129 bytes are allocated to file A 702, 68 bytes are allocated to file B 704, and 156 bytes are allocated to file C 706. Consequently, a total of 353 bytes are required, 353 bytes are allocated, and no storage space is wasted. Advantageously, a more efficient use of disk storage space is obtained.

In FIGS. 6 and 7, file allocation is shown as being contiguous. However, as discussed above, file allocation may take a variety of forms. When files are allocated in a non-contiguous manner, a file may be fragmented with pieces of a single file scattered over different parts of the storage disk. Consequently, the time it takes to a such a file may be increased and performance may be reduced. In order to improve performance, a technique known as defragmentation may be employed which is discussed next.

Figure 8:
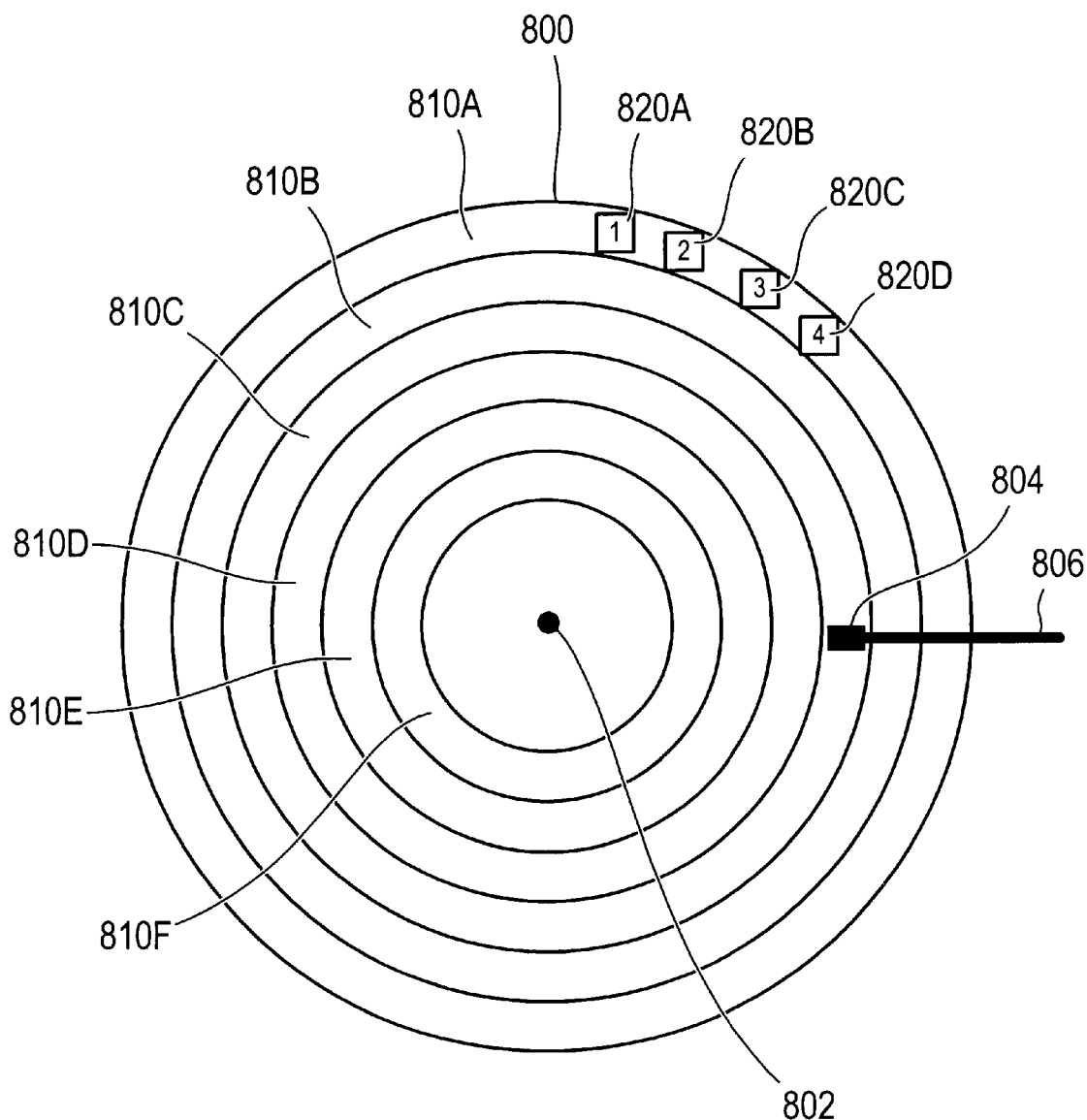
FIG. 8 is an illustration of file allocation in a storage disk.

FIG. 8 is an illustration of a typical storage disk. Included are platter 800, spindle 802, arm 806, read/write head 804, tracks 810A–810F, and file 820. In typical operation, platter 800 spins about spindle 802. Data is stored on platter 800 in concentric circles, shown as tracks 810. Each track may contain a number of storage blocks or allocation units as described above. Read/write head 804 is affixed to arm 806 which moves either toward the center of platter 800, or toward the edge of platter 800 in order to be positioned over the desired track. In order to read data from the disk, both the track and sector or block must be known. First, the read/write head is positioned over the correct track and then data is read from the appropriate sectors on the track. In FIG. 8, file 820 is stored in four blocks, 820A–820D. All four blocks 820 in this case are stored on a single track, 810A. If file 820 is to be read, then read/write head 804 is positioned over track 810A and data is read from the appropriate blocks with no further movement of read/write head 804 required. Having all data for a file stored on a single track provides for efficient read/write operations. However, if data for a file is not all stored on a single track, efficiency is reduced.

Figure 9:
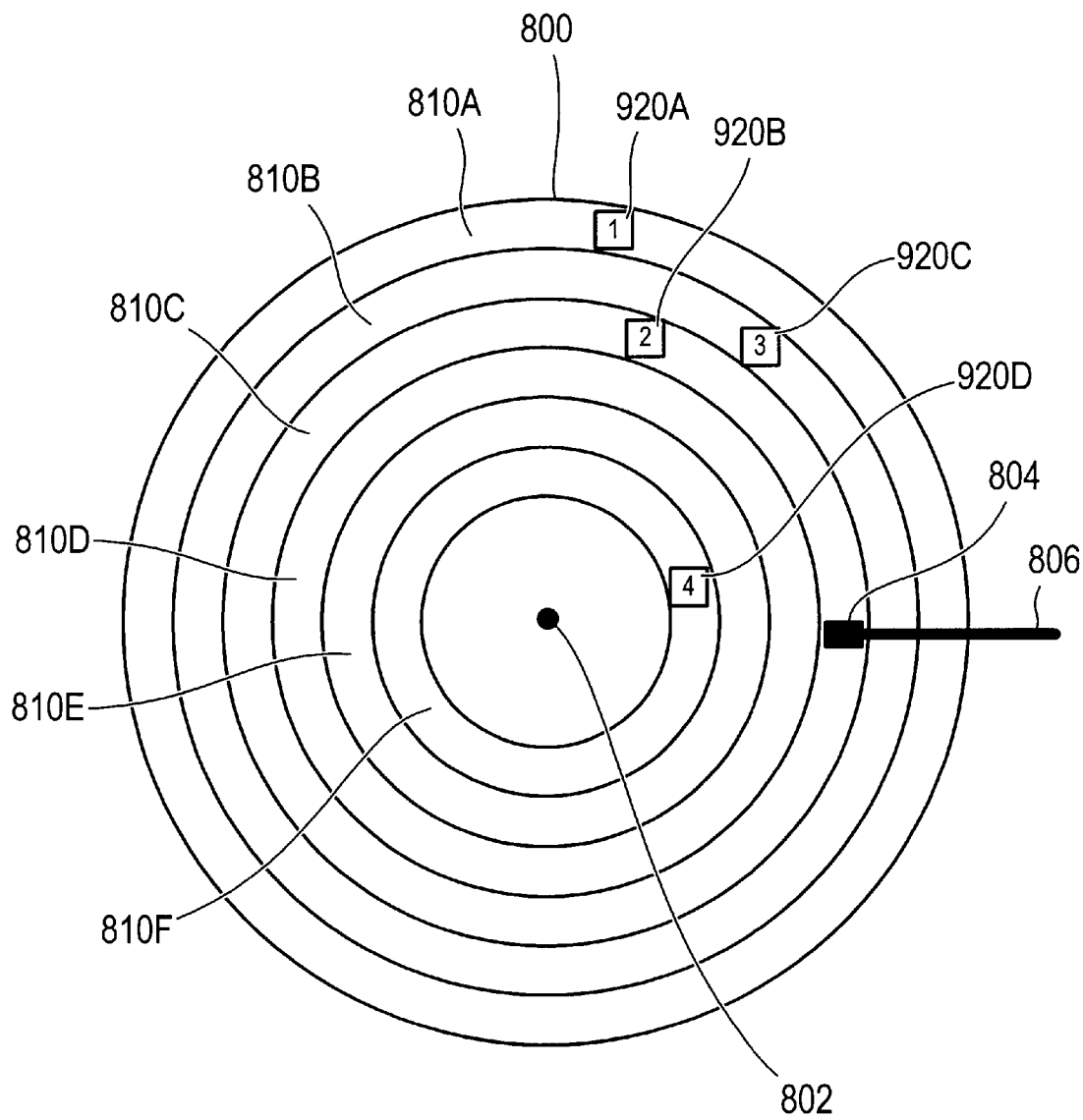
FIG. 9 is an illustration of file allocation in a storage disk.

FIG. 9 shows a storage disk as in FIG. 8, except the file 920 in FIG. 9 is stored over a number of tracks. File 920 is stored in four blocks. File block 920A is stored on track 810A, file block 920B is stored on track 810C, file block 920C is stored on track 810B, and file block 920D is stored on track 810F. When a read of file 920 is done, read/write head 804 seeks the beginning of the file on track 810A and reads the first file block 920A. Read/write head 804 then repositions itself to track 810C and reads file block 920B. Read/write head 804 then repositions itself to track 810B and reads file block 920C. Finally, read/write head 804 repositions itself to track 810F and reads file block 920D. Due to the numerous repositions required of read/write head 804, the total time to read file 920 is increased and overall system performance may be reduced.

Defragmentation involves relocating scattered blocks of data to as few tracks as possible in an effort to reduce the number of times the read/write head must be repositioned in order to read from or write to a file. For example, in FIG. 9, file 920 is scattered across four tracks of disk 800. Assuming there is sufficient space for file 920 on track 810A, defragmentation may entail reading file blocks 920B, 920C, and 920D and writing them to track 810A. The areas of disk 800 on tracks 810B, 810C and 810F which were previously allocated to file 920 are de-allocated and made available.

Figure 10:
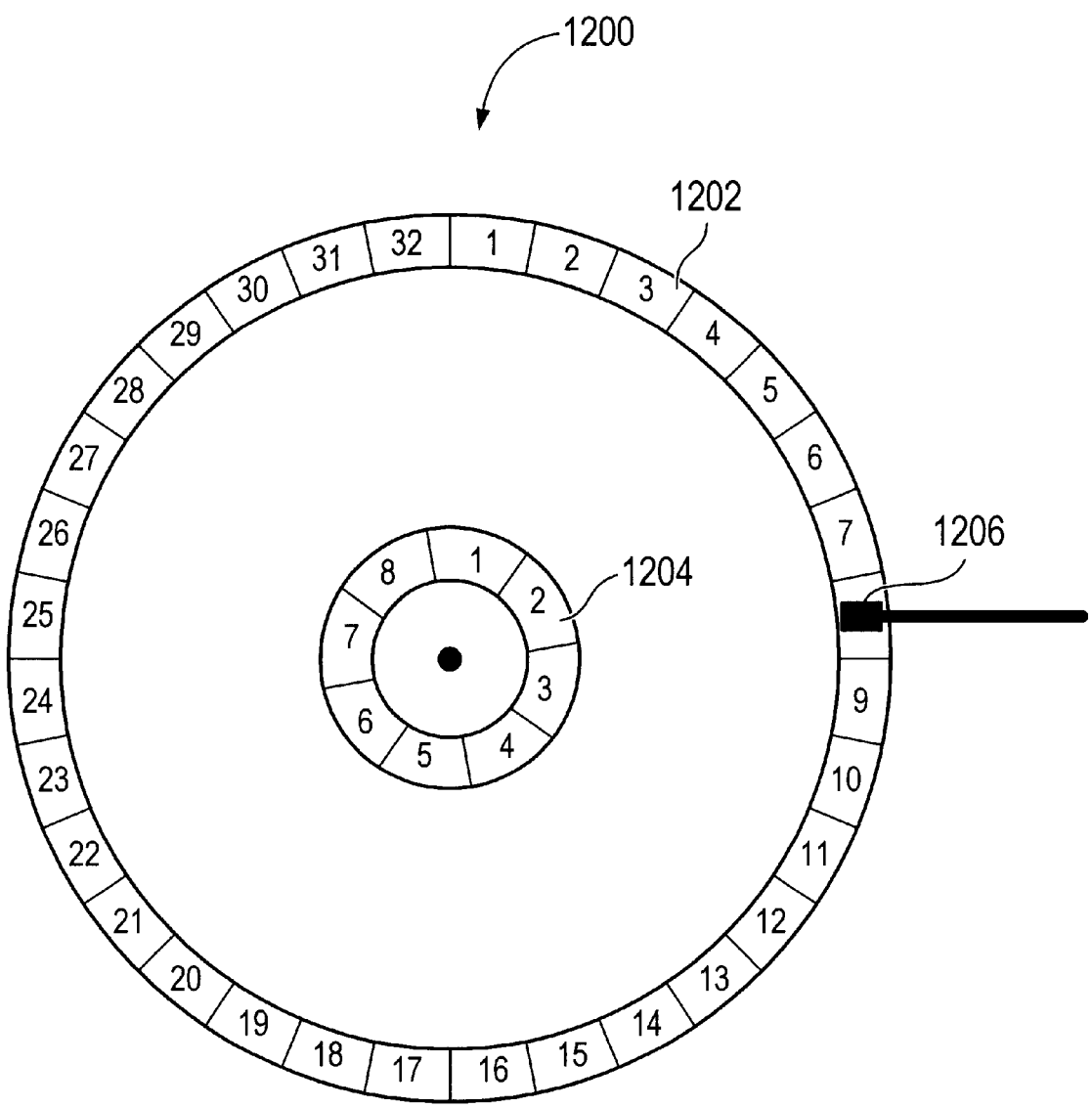
FIG. 10 is an illustration of zoned bit recording.

While moving the noncontiguous blocks of a single file to fewer tracks may improve storage access performance, choosing which tracks to move the data to can be very important as well. Due to the fact that tracks toward the outer edge of a platter contain more area, more sectors may be allocated to the outer tracks than the inner tracks using a technique called "Zoned Bit Recording" (ZBR). FIG. 10 illustrates how ZBR may be used. FIG. 10 includes disk 1200, read/write head 1206, outer track 1202 and inner track 1204. Inner track 1204 and outer track 1202 are divided into sectors. By taking advantage of the additional area in the outer track 1202, more sectors may be created for storage. As shown in FIG. 10, outer track 1202 includes 32 sectors, whereas inner track 1204 includes only 8 sectors.

Because many more sectors exist in outer track 1202 than inner track 1204, the probability that more of a file may be wholly contained in an outer track is greater than in an inner track. Consequently, accessing a file in an outer track is likely to involve fewer read/write head repositions to other tracks in order to find the relevant data and performance may be improved. Therefore, when defragmenting a disk, moving data to the outer tracks may result in improved performance.

Data Striping and Mirroring

Figure 11:
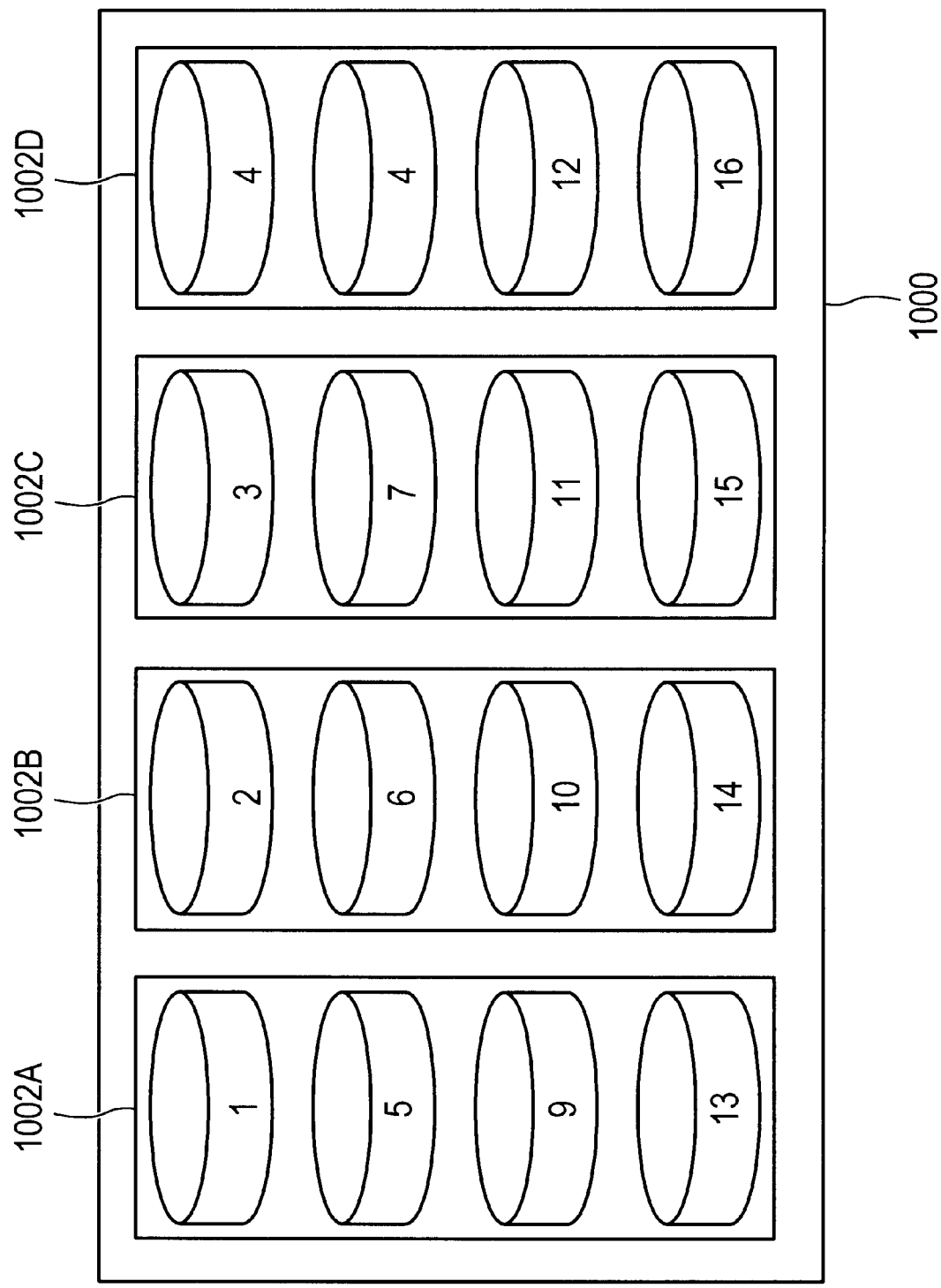
FIG. 11 is a diagram of a striped disk array.

To further improve performance, data may be stored using a technique called "striping". FIG. 11 is a diagram illustrating how striping may be implemented in a disk array. Included in FIG. 11 are disk array 1000 and disk drives 1002A–1002D. Disk array 1000 may be commonly referred to as a Redundant Array of Independent Disks (RAID). The use of RAID involves an array of disks which appear as a single drive to the system. Disk array 1000 includes four disk drives 1002A–1002D. Each drive 1002 is divided into four sections or stripes for a total of 16 stripes, 1–16. Data striping involves storing data in stripes across multiple drives and is sometimes called RAID 0.

For example, given a file A to be stored in three blocks on disk array 1000, one block of file A may be stored in stripe 1 of disk 1002A, a second block of file A on stripe 2 of disk 1002B, and the third block of file A on stripe 3 of disk 1002C. Subsequently, when reading or writing to file A, the three blocks of data may be accessed concurrently on drives 1002A, 1002B, and 1002C. Consequently, read/write access performance may be significantly improved by accessing multiple parts of the data concurrently, rather than sequentially. In addition, to further enhance performance file striping capability may be made native to the file system. In a typical system, striping support may be implemented as management software running on the host system. By making striping native to the file system, the overhead inherent in running add on software is reduced and performance may be improved. Further, when defragmenting data stored on disks as described above, data may be moved to outer tracks and stored in stripes. This combination of defragmentation, moving to outer disks, and storing in stripes may improve data access rates and overall system performance.

Figure 12:
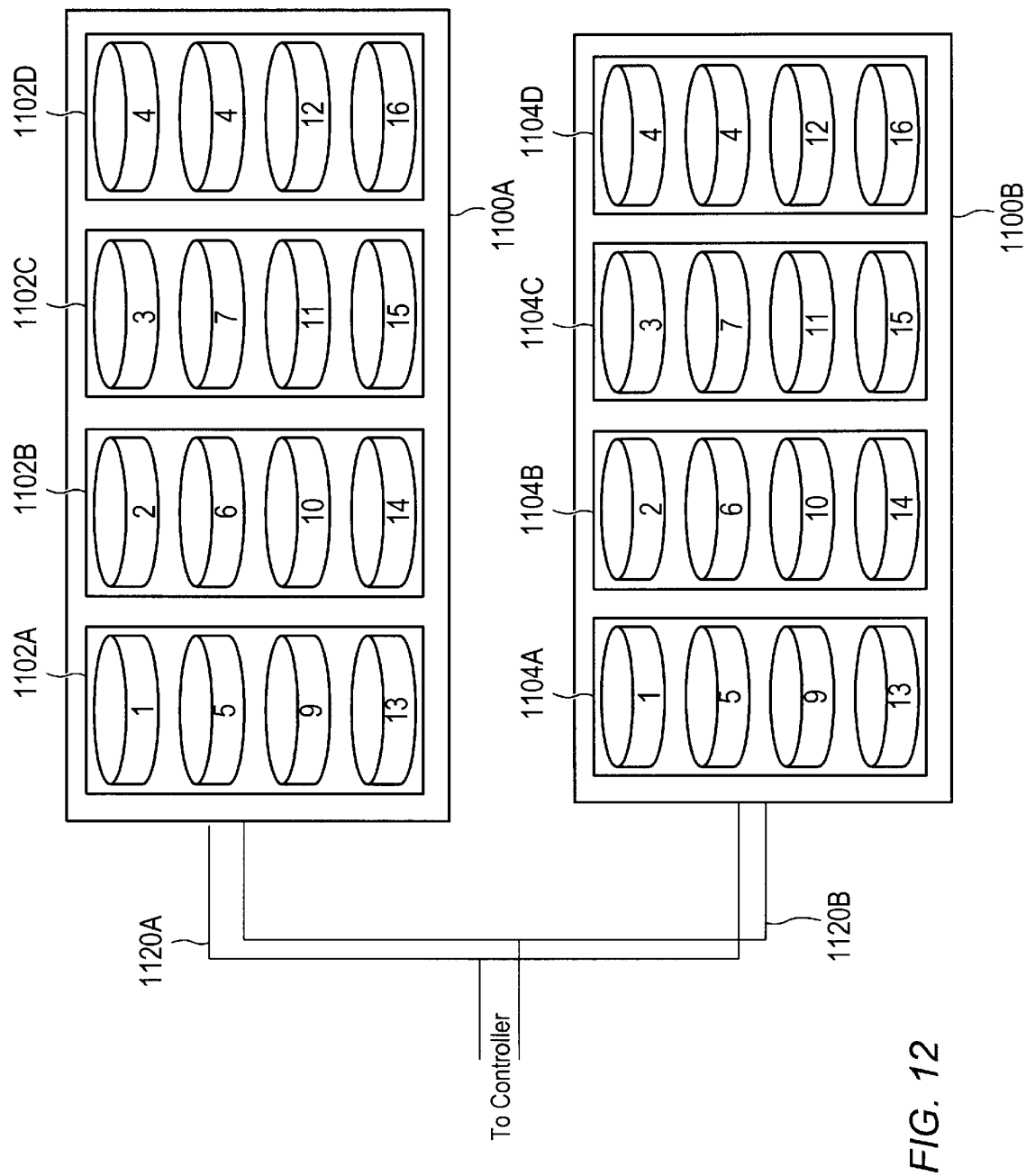
FIG. 12 is a diagram of a mirrored, striped disk array.

Another important feature of storage systems is reliability. Because loss of data can result in severe consequences, methods of improving data reliability have become increasingly important. RAID 1 is one technique used to improve data reliability. RAID 1 involves keeping a mirror copy of data stored on the system. FIG. 12 is an example of one embodiment of a RAID 1 storage system. FIG. 12 includes disk arrays 1100A and 1100B. Disk array 1100A includes drives 1102 and disk array 1100B includes drives 1104. Disk array 1100A is coupled to data bus 1120A and disk array 1100B is coupled to data bus 1120B.

Disk arrays 1100 are seen as a single drive by the system. Storage space seen by the system encompasses a single disk array. For example, a storage network may see disk arrays 1100 as a single drive with 16 stripes. One disk array, say 1100B may be designated a backup array. Consequently, all data writes will be to disk array 1100A, but copied to disk array 1100B. In the event data is corrupted or otherwise lost on disk array 1100A, disk array 1100B may provide a backup copy of the data. Advantageously, the reliability of stored data is theoretically doubled. Further, by combining the techniques of mirroring with the native striping scheme and dynamic storage allocation schemes described above, a storage system may have improved reliability, improved performance, and more efficient use of storage space, respectively. In addition, to further enhance performance, striping, mirroring and defragmentation capability may all be made native to the file system. In a typical system, these features may be implemented as add-on software runing as an application on the host system. By making them native to the file system and part of the operating system, the overhead inherent in running add-on software is reduced and performance may be improved.

Organization of File Systems

The organization and structure of a file system may assume a variety of forms. Two commonly used forms are clustered and log structured file systems. In the clustered file system, attempts are made to store related files and data in close proximity to one another. This spatial locality increases the probability that a file may be read in a single, sequential file access. Because data is frequently stored in contiguous locations, time spent seeking blocks of data for a file in disparate locations on a disk is reduced and performance may be improved. On the other hand, log structured file systems structure the file system as a single log and may provide benefits in other ways, as will be discussed below.

Figure 13:
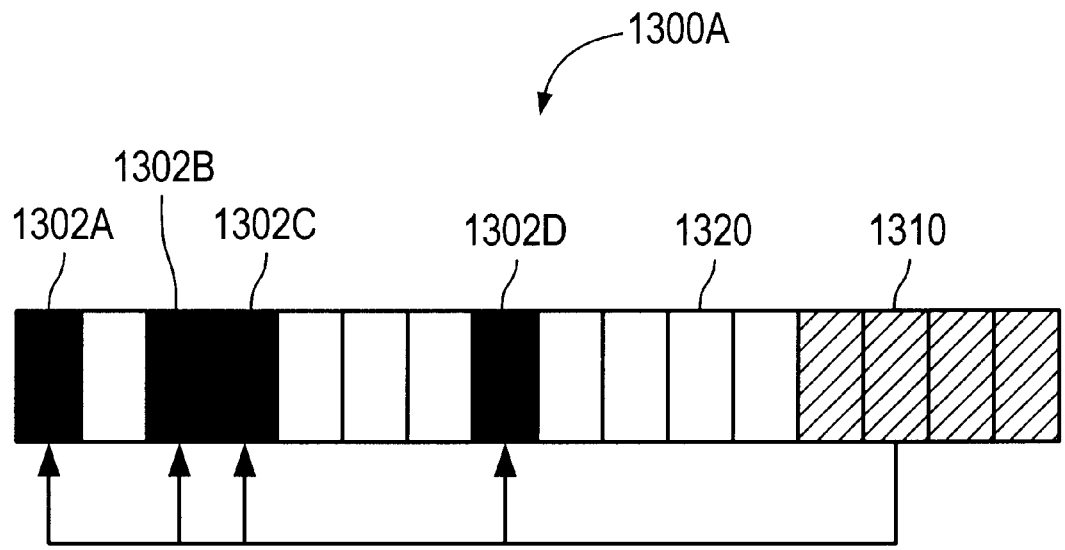
FIG. 13 is a diagram illustrating a clustered file system.
Figure 13:
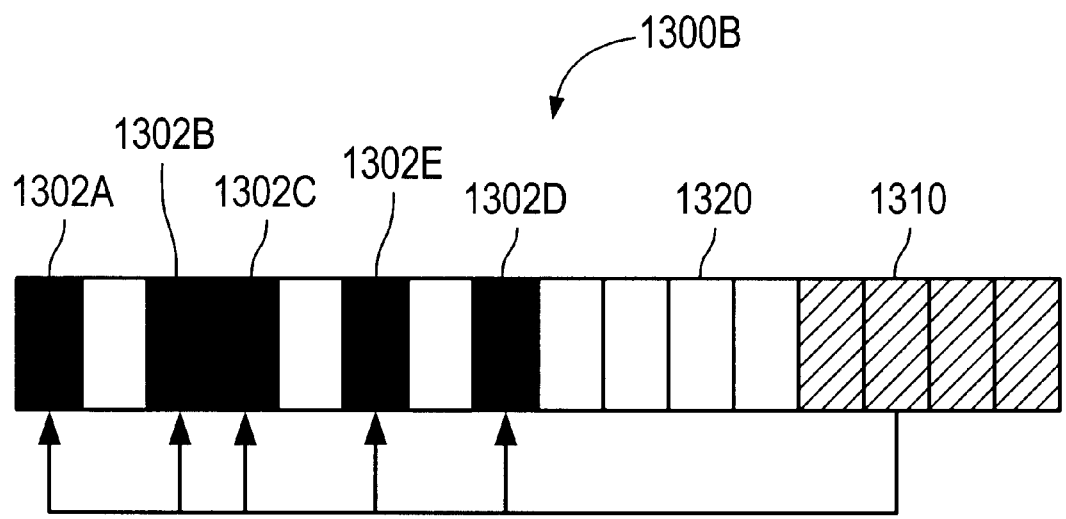

FIG. 13 is an illustration of a clustered file system. Included in FIG. 13 is a sequence of storage blocks which may be on a disk. Clustered file systems may be characterized by a map in a fixed location for each file stored on the disk. For example, in Unix, it is common for the map, or inode, for a file to reside in a fixed location. As discussed above, the map for a file may include information about the file, such as file type, access rights, owners, timestamps, size, and pointers to data blocks. One example of a clustered file system is the Fast File System (FFS). In the FFS, a locality write policy is pursued in which blocks of data for a file are typically placed within the same cylinder group on the disk. By placing related data in the same cylinder group, seek latency may be reduced and overall read performance improved. The clustered file system uses an update-in-place modification policy. When a block of data is modified in a clustered file system, the block must first be found, read, modified, and finally rewritten to the same location. The inode for an update-in-place system is also read, modified, and stored in the same place. This update-in-place policy may have certain drawbacks during recovery which will be discussed below.

The first sequence of blocks shown in FIG. 13, 1300A, represents storage locations prior to storing a new block of data. The second sequence of blocks, 1300B, represents the same sequence of storage locations after storing a new block of data. In FIG. 13, the striped blocks represent maps for files stored on the disk. Solid colored blocks represent stored blocks of data and uncolored blocks represent unused storage blocks. In blocks 1300A, map 1310 represents the map for a file with four blocks of data, 1302A–1302D, as indicated by the arrows from map 1310. Blocks 1300B represent the same storage blocks after storing an additional block of data. Blocks 1300B show that map 1310 has not changed location. However, a new block of data, 1302E, has been added to the file and its address included in map 1310. As illustrated by FIG. 13, the file maps indicating the location of blocks of data for a file remain in a fixed location on the disk. In addition, effort is made to store new blocks of data for a particular file in close proximity to its other data.

In contrast to the clustered file system, log structured file systems follow a different approach. Log structured file systems (LSF) treat an entire disk as a single log which records modifications related to file stored on the disk. Data for files in a log structured file system are stored in a continuous stream, without seeking for the locations of blocks which may be modified. Like the clustered file system, LSF includes a map for each file which points to the blocks of data for that file. However, unlike the clustered approach, these file maps are not stored in a fixed location. In LSF, each time a file is modified, the modified data and the modified map are appended to the end of the log in sequence.

Figure 14:
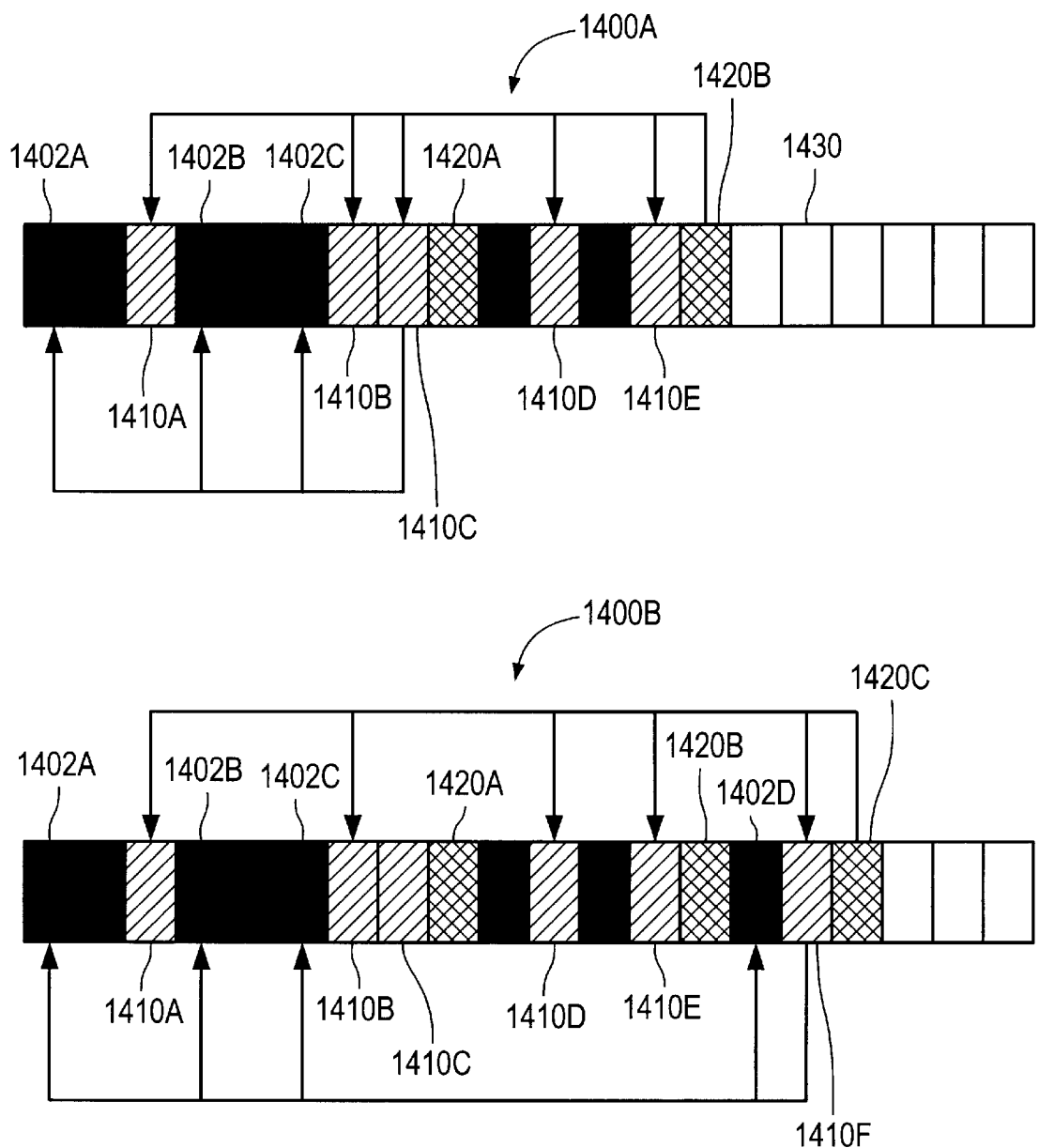
FIG. 14 is a diagram illustrating a log structured file system.

FIG. 14 illustrates the structure of an LSF. Included in FIG. 14 is a sequence of storage blocks prior to the addition of a new block of data, 1400A, and after, 1400B. Because maps in an LSF are written to new locations when a file is modified, a new map is needed to keep track of the location of this moving map. This new map may be referred to as a super-map. In addition, the super-map may be written to disk periodically to facilitate check pointing and quick recovery. In FIG. 14, solid colored blocks 1402 represent stored block of data for a file. Also, striped blocks 1410 represent file maps and cross hatched blocks 1420 represent super-maps. Uncolored blocks in FIG. 14 represent unused storage blocks.

In blocks 1400A, two super-maps 1420 are shown. Super-map 1420B represents the most recent super-map and contains pointers to the maps stored on the disk. One such map, 1410C, shows the file blocks 1402A–1402C to which it points. Blocks 1400B represent the same storage locations subsequent to the addition of another file block 1402D to map 1410C. As illustrated in FIG. 14, file block 1402D is appended to the end of the log structure. Rather than modifying and rewriting map 1410C, a new map is created 1410F and appended to the end of the log. In this case, the new super-map 1420C is appended to the log as well. Super-map 1420C points to the most recent map 1410F for the newly modified file. This process of appending to the end of the log is repeated each time a file is modified. In this manner, the file system may be seen as a single long running log. Because individual blocks of a file are not modified in place, there is no need to seek each block for modification. This feature of just writing to the end of the log may provide for significant increases in write performance.

Some of the other benefits of an LSF include fast recovery, temporal locality and the ability to maintain versioning. As discussed above, in the clustered file system when a system interruption occurs, the in place structures may be left in an inconsistent state. Recovery in the clustered file system requires a complete scan of the file system to insure its integrity. Where inconsistencies are found, repairs may be attempted. This process of recovery in the clustered file system can take a significant period of time to complete. In contrast, an LSF contains all recently modified information at the end of the log. Older file blocks in an LSF are not modified and generally need not be checked. Consequently, recovery in an LSF may be much faster than in the clustered file system. In addition, because files written at about the same time in an LSF may be stored in close proximity to one another, a later read of such files might be achieved with a single read. This too may provide for performance increases. Finally, because old versions of files continue to exist in the file system, recovering older versions of files may be done with less difficulty than in the clustered file system.

File System Recovery

Because computer networks have become such an integral part of today's business environment and society, reducing downtime is of paramount importance. When a file system or a node crashes or is otherwise unavailable, countless numbers of people and systems may be impacted. Consequently, seeking ways to minimize this impact is highly desirable. For illustrative purposes, recovery in a clustered and log structured file system will be discussed. However, other file systems are contemplated as well.

File system interruptions may occur due to power failures, user errors, or a host of other reasons. When this occurs, the integrity of the data stored on disks may be compromised. In a classic clustered file system, such as FFS, there is typically what is called a "super-block". The super-block is used to store all important information about the file system. This data, commonly referred to as meta-data, frequently includes information such as the size of the file-system, number of free blocks, next free block in the free block list, size of the inode list, number of free inodes, and the next free inode in the free inode list. Because corruption of the super-block may render the file system completely unusable, it may be copied into multiple locations to provide for enhanced security. Further, because the super-block is affected by every change to the file system, it is generally cached in memory to enhance performance and only periodically written to disk. However, if a power failure or other file system interruption occurs before the super-block can be written to disk, data may be lost and the meta-data may be left in an inconsistent state.

Ordinarily, after an interruption has occurred, the integrity of the file system and its meta-data structures are checked with the File System Check (FSCK) utility. FSCK walks through the file system verifying the integrity of all the links, blocks, and other structures. Generally, when a file system is mounted with write access, an indicator may be set to "not clean". If the file system is unmounted or remounted with read-only access, its indicator is reset to "clean". By using these indicators, the fsck utility may know which file systems should be checked. Those file systems which were mounted with write access must be checked. The fsck check typically runs in five passes. For example, in the ufs file system, the following five checks are done in sequence: (1) check blocks and sizes, (2) check pathnames, (3) check connectivity, (4) check reference counts, and (5) check cylinder groups. If all goes well, any problems found with the file system can be corrected.

While the above described integrity check is thorough, it can take a very long time. In some cases, running fsck may take hours to complete. This is particularly true with an update-in-place file system like FFS. Because an update-in-place file system makes all modifications to blocks which are in fixed locations, and the file system meta-data may be corrupt, there is no easy way of determining which blocks were most recently modified and should be checked. Consequently, the entire file system must be verified. One technique which is used in such systems to alleviate this problem, is to use what is called "journaling". In a journaling file system, planned modifications of meta-data are first recorded in a separate "intent" log file which may then be stored in a separate location. Journaling involves logging only the meta-data, unlike the log structured file system which is discussed below. If a system interruption occurs, and since the previous checkpoint is known to be reliable, it is only necessary to consult the journal log to determine what modifications were left incomplete or corrupted. A checkpoint is a periodic save of the system state which may be returned to in case of system failure. With journaling, the intent log effectively allows the modifications to be "replayed". In this manner, recovery from an interruption may be much faster than in the non-journaling system.

Recovery in an LSF is typically much faster than in the classic file system described above. Because the LSF is structured as a continuous log, recovery typically involves checking only the most recent log entries. LSF recovery is similar to the journaling system. The difference between the journaling system and an LSF is that the journaling system logs only meta-data and an LSF logs both data and meta-data as described above.

Figure 15:
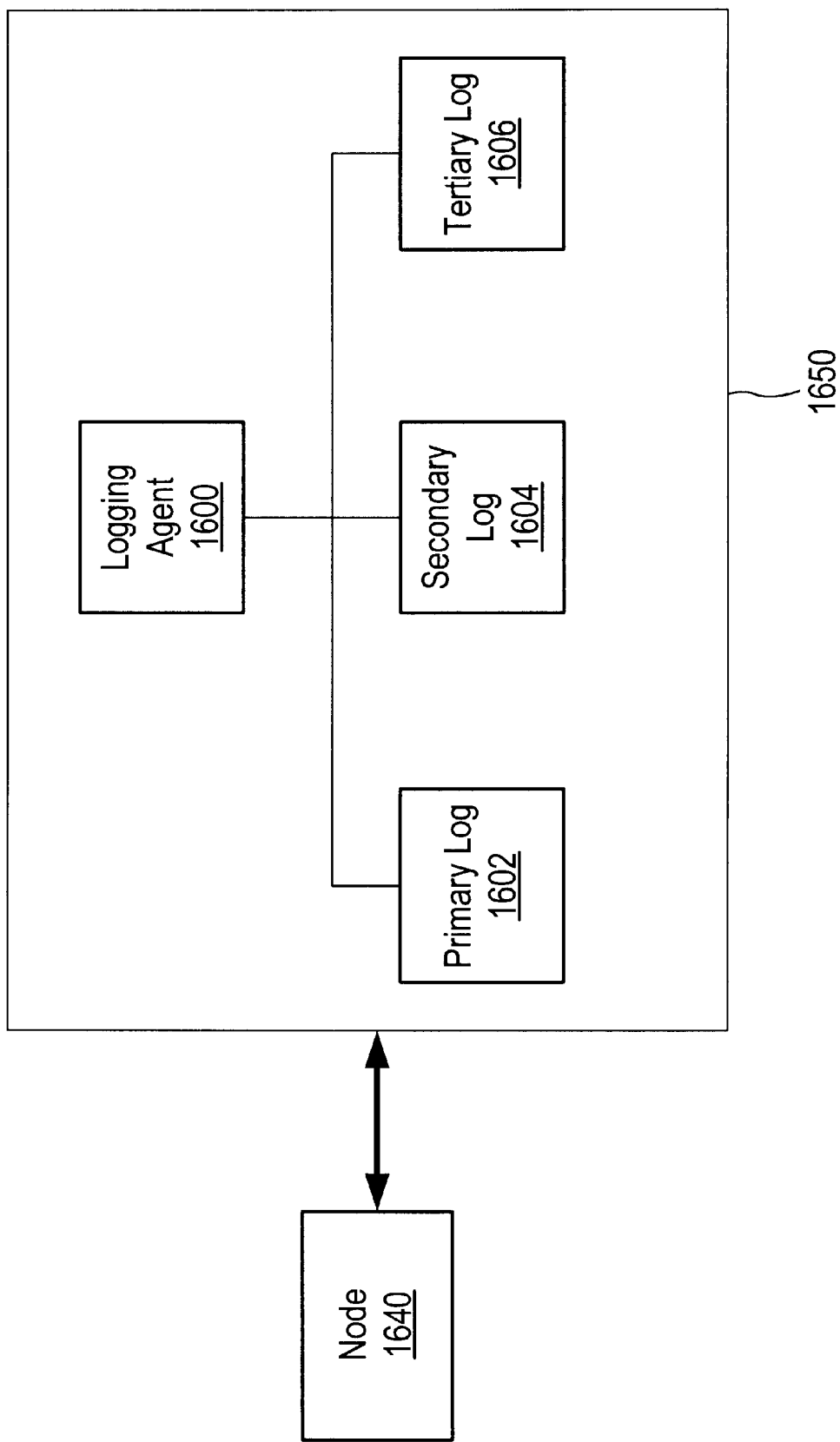
FIG. 15 is a block diagram of an intent logging mechanism.

Whether a classic file system, LSF, or other file system is used, the utilization of an intent log as described above may be used. FIG. 15 shows a block diagram of an intent log mechanism 1650 and a node 1640. Included in logging mechanism 1650 are logging agent 1600, primary log 1602, secondary log 1604, and tertiary log 1606. Primary log 1602, secondary log 1604, and tertiary log 1606 serve as intent logs. Logging agent 1600 monitors logs 1602, 1604, and 1606 for availability. In ordinary operation, when node 1640 plans a write which will alter a file system upon which it is mounted, a description of the planned modification is written to primary log 1602. Secondary log 1604 and tertiary log 1606 serve as redundant intent logs and may receive a copy of the planned modification. When an intent log becomes unavailable, logging agent disables the unavailable intent log such that further intent log operations are written to either of backup secondary log 1604 or tertiary log 1606. In one embodiment, if the primary log becomes unavailable, secondary log 1604 will assume the role of primary log 1604. Likewise, if both primary log 1602 and secondary log 1604 become unavailable, tertiary log 1606 will take over the responsibility of primary intent log. If secondary log 1604 or tertiary log 1606 assume the role of primary intent log and primary log 1602 becomes available again, logging agent 1600 synchronizes data between the newly available primary intent log 1602 with the backup intent logs 1604 and 1606 and re-enables the primary log 1602. In this manner, logging agent 1600 maintains synchronization between available logs 1602, 1604 and 1606.

File System Check Logging

If a host, or node, on a storage area network suffers an interruption, it may become necessary to verify all file systems to which it is attached. Because a SAN node may be attached to several file systems, the process may be very lengthy. When a node must reboot or otherwise recover from an interruption, it typically begins the process of checking all affected file systems in sequence. First, each file system is checked to determine if it requires verification. For example, an indicator may be set which shows the file system was mounted with write access and is "unclean". If a file system requires verification, the node determines if the file system is locked. A file system may be locked due to a current or interrupted access. Because modifications to a file system may interfere with an integrity check, locked file systems may not ordinarily be verified. If such a file system is locked, the node waits until it is unlocked and then begins verification. Otherwise, if the file system is unlocked, the process of verification proceeds. Prior to verification, a forced unmounting of the file system by all other nodes may be done to prevent interruption. Finally, file system verification may be performed.

One of the problems with the reboot of a node and the subsequent verification of file systems is the time the node remains unavailable. Generally, a node is unavailable from the time of interruption to the completion of file system verification. As discussed above, file system verification can be lengthy. Consequently, a node may be unavailable for a relatively long period of time. In order to alleviate this problem and reduce the downtime of the node, a file system recovery logging mechanism is introduced.

Upon recovery or reboot, if a file system is detected which requires verification and the file system is locked, an indication of this fact is made in a recovery log and file system checking continues. A file system which is attached to, or was mounted by, the failed node may require verification. The recovery log may be maintained in a separate file system or storage device. Once an initial check of the file systems has been completed, any file systems which were logged as being locked are checked in the background. While the background check continues, the node is otherwise available. While background checking continues, the node may access all but the locked file systems. If a file system is locked due to an interrupted modification, as indicated by an intent log file, that intent log file will be locked. Transactions to other file systems during the time a primary intent log file is locked, will be logged in a backup intent log file. When one of the logged file systems is unlocked, the node locks and verifies it as above. Once a previously locked file system is verified, the logging agent resynchronizes the corresponding intent log file with the backup log files and re-enables the previously locked intent log file. Advantageously, downtime of the node is reduced.

Figure 16:
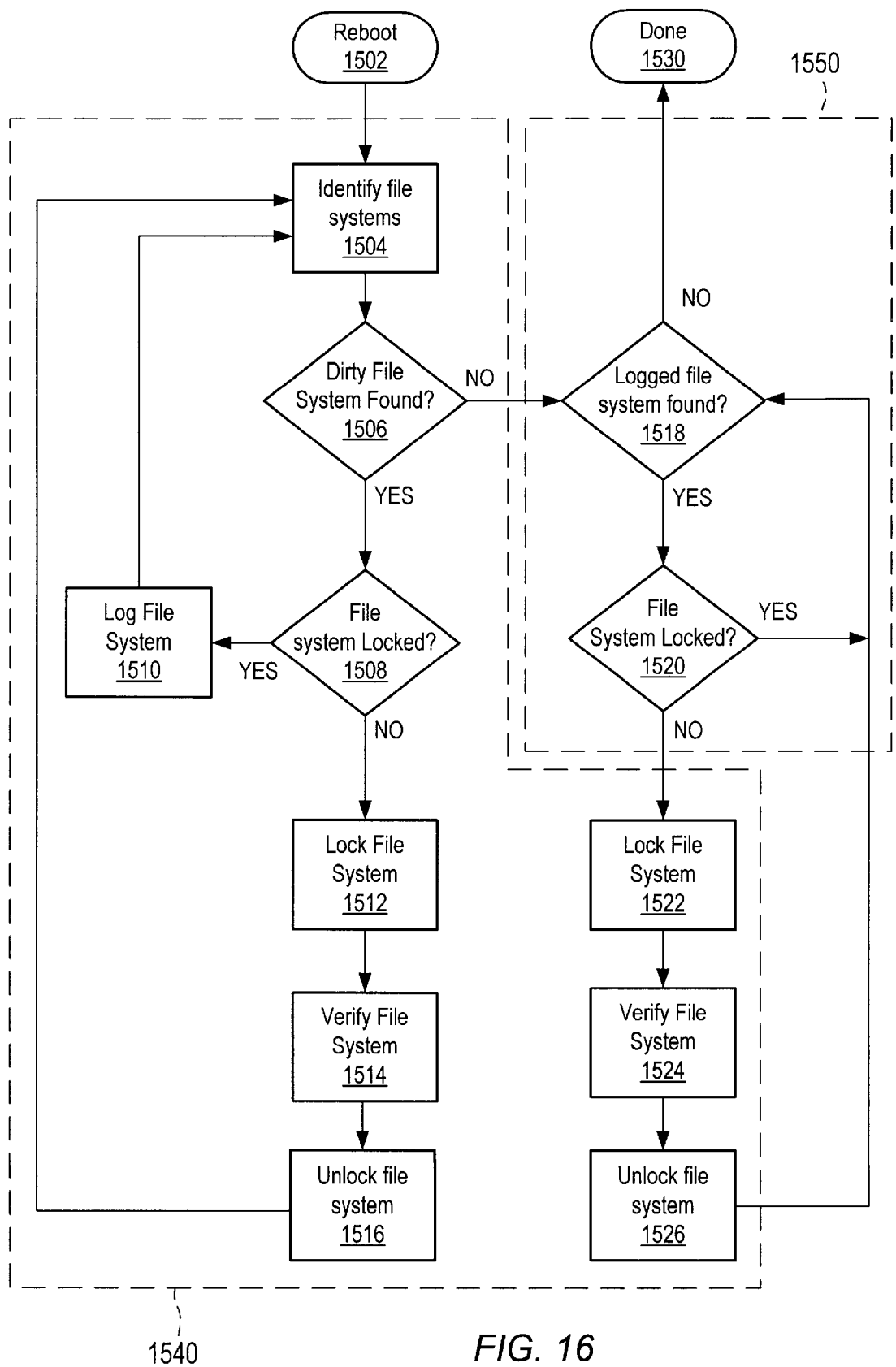
FIG. 16 is a flowchart showing one embodiment of a recovery logging method.

FIG. 16 is a flowchart illustrating one embodiment of the mechanism. In FIG. 16 the process is initiated by a system reboot 1502. Process 1504 involves searching for file systems to which the node was or is attached. If a file system is found in decision block 1506 which is "dirty" (requires verification), the flow continues to decision block 1508; otherwise, the flow continues to process 1510. In decision block 1508, if the file system is currently locked, flow continues to process 1510 where a notation is made in a log file. Such a notation may include an identification of the file system. Advantageously, processing does not stop to wait for the file system to become unlocked. Once a file system is logged in process 1510, flow continues to process 1504 where a search for file systems continues. In decision block 1508, if the file system is not locked, the flow continues to process 1512 where the file system is locked, then to process 1514 where the file system is verified, and finally to process 1516 where the file system is unlocked. Upon unlocking the file system 1516, the flow returns to the process of searching for further file systems 1504. If in decision block 1506, no dirty file systems are found, the log file is checked 1518 for entries. If an entry is found in the log file 1518, the associated file system is checked to determine if it is locked 1520. If the file system is locked 1520, flow returns to decision block 1518 where the log file is consulted again. On the other hand, if the file system in decision block 1520 is not locked, the node locks the file system 1522, verifies the file system 1524, then unlocks the file system 1526. Upon unlocking the file system 1526, flow returns to decision block 1518 to check the log file for further entries. When no further log files are detected in decision block 1518, file system checking and verification is complete and the flow terminates 1530.

FIG. 16 indicates two categories of processing, the categories indicated by blocks 1540 and 1550. The first pass through all file systems is indicated by the processing blocks encompassed by block 1540. Processing within block 1540 occurs in the foreground. In contrast, once the first pass has completed, processing continues within block 1550. Processing within block 1550 occurs in the background. Foreground and background processing are well known methods of executing code within operating systems such as Unix and Windows NT. Generally, foreground processes have input and output associated with a terminal, are run in series, have high priority, and will preclude the node from being otherwise available. However, background processes are not associated with a terminal and leave the node available for other processing tasks. Several background processes may be running while a user interacts with a terminal in the foreground. By combining locked file system logging with the above described background monitoring of the log file, the node may be made available for processing much more rapidly, thereby reducing downtime. Further, this mechanism of reducing the downtime of a node may be embodied in a SAN, LAN, or other form of computer network and may be used in conjunction with common file systems or the universal file system described herein.

Numerous variations and modifications will become apparent to those skilled in the art once the above disclosure is fully appreciated. It is intended that the following claims be interpreted to embrace all such variations and modifications.

What is claimed is:

1. A method of enabling a first host of a heterogeneous storage area network to access a universal file system of a storage device on said storage area network, wherein said storage area network comprises an independent network comprising a storage area network interconnect to which a plurality of independent storage devices including said storage device are coupled, said method comprising:

augmenting an operating system of said first host, wherein a native file system of said first host is incompatible with said universal file system;

mounting said universal file system of said storage device by said first host; and mounting said file system of said storage device by a second host, wherein said second host is coupled to said storage area network, and wherein a native file system of said second host is incompatible with said file system of said first host;

wherein each of said plurality of storage devices are independently accessible by said first host and said second host.

2. The method of claim 1, wherein said first host and said second host read data from and write data to said universal file system.

3. The method of claim 1, wherein said augmenting comprises the modification of program code of said operating system.

4. The method of claim 1, wherein said augmenting comprises modifying a kernel of said operating system.

5. The method of claim 1, further comprising:

augmenting an operating system of said second host, wherein said augmenting comprises the modification of program code of an operating system of said second host, wherein said native file system of said second host is incompatible with said file system of said storage device.

6. The method of claim 1, further comprising sharing data between said first host and said second host, wherein said sharing comprises:

writing a first data by said first host to said storage device; and reading said first data from said storage device by said second host.

7. The method of claim 1, further comprising sharing data between said first host and said second host, wherein said sharing comprises:

writing a first data by said second host to said storage device; and reading said first data from said storage device by said first host.

8. The method of claim 1, further comprising:

defragmenting said storage device by said first host, wherein said defragmenting includes consolidating fragmented data on said storage device, wherein said defragmenting capability is a result of said augmenting.

9. The method of claim 8, wherein said consolidating includes moving said fragmented data to outer tracks of disks within said storage device.

10. The method of claim 1, further comprising:

storing data on said storage device, wherein said storing is done by said first host using data striping, wherein said striping capability is a result of said augmenting.

11. The method of claim 1, further comprising:

storing data on said storage device, wherein said storing is done by said first host using data mirroring, wherein said mirroring is a result of said augmenting.

12. The method of claim 1, further comprising:

controlling file access, wherein said file access is controlled using a universal permissions scheme, wherein said controlling capability is a result of said augmenting.

13. The method of claim 1, further comprising:

allocating data using a dynamic allocation scheme, wherein said allocating capability is a result of said augmenting.

14. The method of claim 13, further comprising:

controlling file access, wherein said file access is controlled using a universal permissions scheme, wherein said controlling is a result of said augmenting.

15. The method of claim 14, further comprising:

storing data on said storage device, wherein said storing is done by said first host using data mirroring, wherein said data mirroring capability is a result of said augmenting.

16. The method of claim 14, further comprising:

storing data on said storage device, wherein said storing is done by said first host using data striping, wherein said striping capability is a result of said augmenting.

17. The method of claim 14, further comprising:

defragmenting said storage device, wherein said defragmenting is by said first host, wherein said defragmenting includes consolidating fragmented data on said storage device to outer tracks of disks within said storage device, wherein said defragmenting capability is a result of said augmenting.

18. The method of claim 15, further comprising:

storing data on said storage device, wherein said storing is done by said first host using data striping, wherein said striping capability is a result of said augmenting.

19. The method of claim 15, further comprising:

defragmenting said storage device, wherein said defragmenting is by said first host, wherein said defragmenting includes consolidating fragmented data on said storage device to outer tracks of disks within said storage device, wherein said defragmenting capability is a result of said augmenting.

20. The method of claim 16, further comprising:

defragmenting said storage device, wherein said defragmenting is by said first host, wherein said defragmenting includes consolidating fragmented data on said storage device to outer tracks of disks within said storage device, wherein said defragmenting capability is a result of said augmenting.

21. The method of claim 20, further comprising:

storing data on said storage device, wherein said storing is done by said first host using data mirroring, wherein said data mirroring capability is a result of said augmenting.

* * * * *